United States Patent [19]

Albanese

[11] 4,422,179
[45] Dec. 20, 1983

[54] ELECTRICAL-OPTICAL INTERFACE NETWORK

[75] Inventor: Andres Albanese, Middletown, N.J.

[73] Assignee: Bell Telephone Laboratories, Incorporated, Murray Hill, N.J.

[21] Appl. No.: 283,434

[22] Filed: Jul. 15, 1981

[51] Int. Cl.³ .............................................. H04B 9/00
[52] U.S. Cl. ...................................... 455/601; 455/15; 455/606
[58] Field of Search ................ 455/608, 606, 612, 602, 455/601, 607, 619, 14, 78, 58, 226, 15; 370/1; 340/825.5; 179/170.6, 170.2

[56] References Cited

U.S. PATENT DOCUMENTS

| | | | |
|---|---|---|---|
| 3,991,287 | 9/1976 | May, Jr. et al. | 179/170.2 |
| 4,124,776 | 11/1978 | Nocker | 455/608 |
| 4,234,970 | 11/1980 | Beasley et al. | 455/607 |
| 4,271,536 | 6/1981 | Copeland | 455/619 |

FOREIGN PATENT DOCUMENTS

2458914 12/1974 Fed. Rep. of Germany ...... 455/606

OTHER PUBLICATIONS

Fourth European Conference on Optical Communications, Genoa, Italy, Sep. 1978 Conference Proceedings–"Fibernet: A Fiber Optic Computer Network Experiment"–Rawson–Metcalfe–Norton–Naffarate–Cronshaw.

*Primary Examiner*—John C. Martin
*Assistant Examiner*—Edward L. Coles
*Attorney, Agent, or Firm*—S. Sherman

[57] ABSTRACT

An electrical-optical interface network for use in a carrier-sense, multiple-access system with collision-detection provides two-way transmission between an electrical circuit (5,7,9) and a pair of lightguides (21,22), but prevents signal transmission between the lightguides.

6 Claims, 6 Drawing Figures

ELECTRICAL-OPTICAL INTERFACE NETWORK

This invention relates to networks for interconnecting electrical circuits and optical links.

BACKGROUND OF THE INVENTION

Both lightguides and computer networks are readily available and their uses are continuously growing. It is anticipated that computer networks will benefit by using lightguides as the transmission medium because they provide ground loop isolation, minimize electromagnetic interference, save space, and provide future cost savings over coaxial cable systems where equalization is required.

While conventional computer networks today do not use lightguides, their use in future facilities is currently under study. (See the article by E. G. Rawson et al. entitled "Fibernet: A Fiber Optic Computer Network Experiment", published in the *Fourth European Conference on Optical Communications Conference Proceedings Genoa, Italy, September* 1978 *Conference Proceedings.* However, the use of fiber links involves more than simply replacing the coaxial cable with a length of optical fiber. The optical signal must be detected and converted to an electrical signal and, conversely, the electrical signal must be converted to an optical signal. Inasmuch as these processes are separate, the use of two optical links is required. Furthermore, in a system employing a contention protocol, this must be done in a manner which permits each station to monitor all other stations while transmitting so as to detect the presence of other interfering signals. Simultaneously, the interface network must be capable of avoiding reflections of the incident signals.

SUMMARY OF THE INVENTION

An electrical-optical interface network, in accordance with the present invention, comprises a three port device having an optical input port, an optical output port, and a common electrical input/output port. An optical signal receiver, connected to the optical input port, produces an electrical output signal which is coupled to the common electrical port through a first electrical signal isolator. The common electrical port is coupled to the optical output port through a second electric signal isolator, a coincidence sensor, such as an exclusive OR-gate, and an optical signal transmitter. The output port of the second isolator is connected to one input terminal of the gate, and the output of the optical signal receiver is connected to a second input terminal of the gate.

The network provides simultaneous transmission between the optical input port and the common electrical input/output port, and between the latter and the optical output port. However, transmission between the optical input port and the optical output port is precluded.

It is an advantage of the present invention that it permits new network configurations.

DETAILED DESCRIPTION

Figure 1:
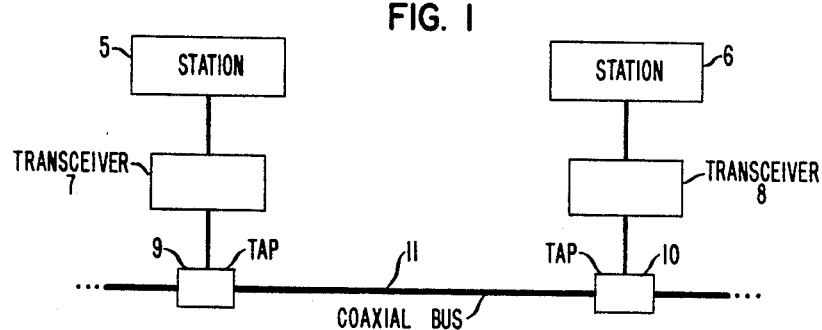
FIG. 1 shows a portion of a typical carrier-sense, multiple-access network to which the invention relates.

Referring the drawings, FIG. 1 shows a portion of a typical carrier-sense, multiple-access communication system with collision-detection (CSMA/CD) where each of the stations (i.e., 5 and 6) is connected to a common coaxial bus 11 by means of a tap 9, 10 and a transceiver 7, 8. Advantageously, the coaxial buses between taps are replaced by lightguides in the manner illustrated in FIG. 2. In this configuration, the coaxial bus 11 is replaced by an optical bus 20 comprising a pair of lightguides 21 and 22 and interface networks 23 and 24. More specifically, connections to taps 9 and 10 are made by means of the interface networks 23 and 24, respectfully, which interconnect the optical and electrical portions of the network. Similarly, other optical buses including interface networks 25 and 26 interface between taps 9 and 10 and other optical lightguides linking portions of the rest of the system.

Figure 3:
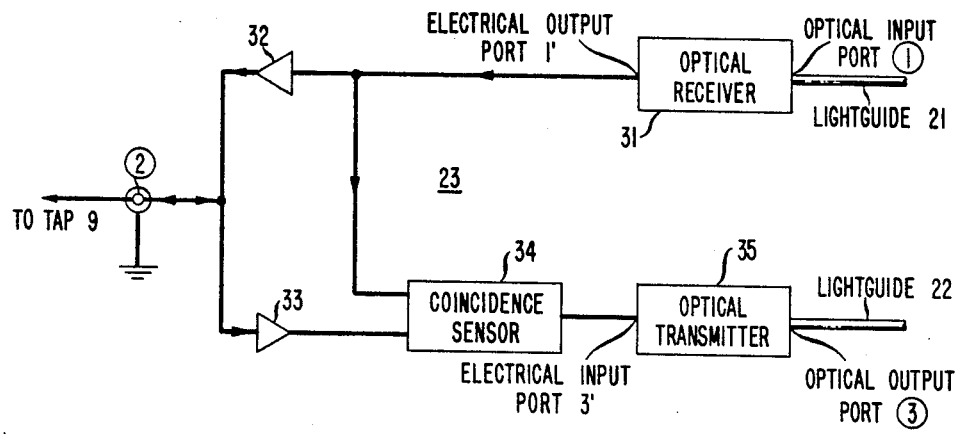
FIG. 3 shows a first embodiment of a network for interfacing between the electrical and optical portions of the network of FIG. 2.

As indicated hereinabove, the function of the interface network is to provide two-way transmission between the electrical and optical circuits while maintaining the collision-detection capability of the system. A circuit configuration for doing this is illustrated in FIG. 3 which shows, in block diagram, the details of an interface network and, in particular, shows interface network 23. As illustrated, each interface network is a three-port network comprising an optical receiver 31 having an optical input port 1 and an electrical output port 1'. The latter is coupled through a first electrical signal isolator 32, such as a buffer amplifier, to a common electrical input/output port 2. The latter, in turn, is coupled through a second electrical signal isolator 33 and a coincidence sensor 34 (such as an exclusive OR-gate) to the electrical input port 3' of an optical transmitter 35. More specifically, one input terminal of sensor 34 is connected to the output terminal of isolator 33 while a second input terminal of sensor 34 is connected to the output terminal of receiver 31.

The interface network is inserted into the CSMA/CD system such that one of the lightguides 21 is connected to optical input port 1; the electrical port 2 is connected to tap 9 of the electrical portion of the system; and the second lightguide 22 is connected to the optical output port 3 of transmitter 35.

In operation, optical signals applied to input port 1 are detected by receiver 31 and the resulting electrical output signal is coupled through isolator 32 to electrical port 2. The same signal is also coupled through isolator 33 to one input terminal of sensor 34. Simultaneously, the electrical output from receiver 31 is also coupled to the other input terminal of sensor 34. Because the two signals applied to the gate are the same, the sensor output is zero. Accordingly, the network converts and transmits the received signal between ports 1 and 2, but none of the incident optical signal in lightguide 21 is transmitted back along lightguide 22. However, if at the same time an interfering signal is present at port 2, the signals applied to the two input terminals of coincidence sensor 34 are no longer balanced, and an output signal is coupled to transmitter 35. Thus, the network is capable of simultaneously transmitting in opposite directions, thereby preserving the collision-detection capability of the system.

Figure 2:
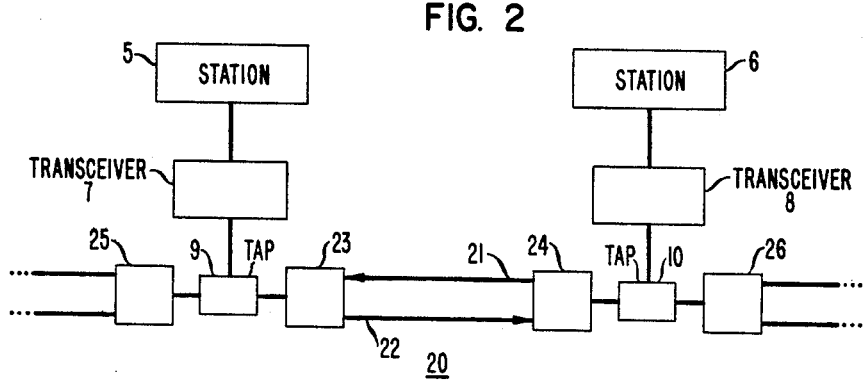
FIG. 2 shows the network portion of FIG. 1 in which the coaxial bus has been replaced by an optical bus.

As indicated in FIG. 2, a typical optical bus is terminated at both ends by an interface network. If there is no traffic in the bus, the AGC circuit in each of the network receivers assumes a maximum gain state which would result in overloading of the receiver when traffic resumes. To avoid this, in an alternative embodiment of the invention illustrated in FIG. 4, means are included in each interface network for refreshing the AGC of the optical receiver located in the remote interface network.

Figure 4:
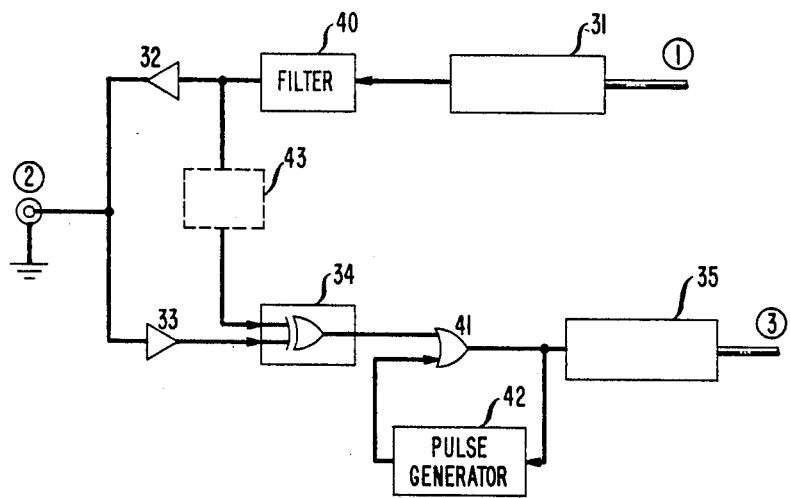
FIG. 4 shows an alternative embodiment of an interface network including an AGC refresher pulse source.

As illustrated in FIG. 4, the AGC refresher includes an OR-gate 41 and a pulse generator 42. Using the same identification numerals as used in FIG. 3 to identify corresponding components, the OR-gate is located between sensor 34 and transmitter 35. The inputs to the OR-gate include the output signal from sensor 34 and the output signal from pulse generator 42. The OR-gate output is coupled to both transmitter 35 and generator 42.

So long as there is traffic present, the OR-gate output inhibits pulse generator 42 for a prescribed period of time. If there is no traffic, the pulse generator produces pulses of approximately 10 nanoseconds duration in lieu of the normal traffic. A filter 40 is shown included in the output circuit of optical receiver 31 to remove AGC refresher pulses generated by a similar source at a remote interface network (i.e., 24).

Figure 5:
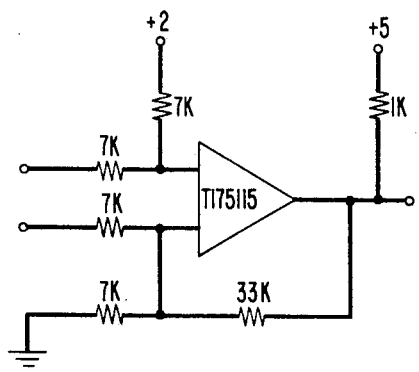
FIG. 5 shows a Schmidt trigger circuit.

As indicated hereinabove, an exclusive OR-gate can be used as the coincidence sensor, as also illustrated in FIG. 4. This may require the inclusion of a delay circuit 43, shown in dashed outline, in the path connecting receiver 31 to sensor 34 to compensate for the delays through the two isolators 32 and 33. Alternatively, a Schmidt trigger circuit can be employed. FIG. 5 shows a Texas Instruments No. 75115 IC connected as a Schmidt trigger for this purpose. In operation, the output goes high only when port 2 goes high and the receiver output goes low.

It should be noted that as a result of the operation of the interface network, the signal transmitted between ports 2 and 3 may be distorted if a signal is being simultaneously transmitted between ports 2 and 3. This, however, is not a problem in that it represents a collision situation in which case both signals will have to be retransmitted. All that is required is that the system be capable of sensing a collision condition.

Figure 6:
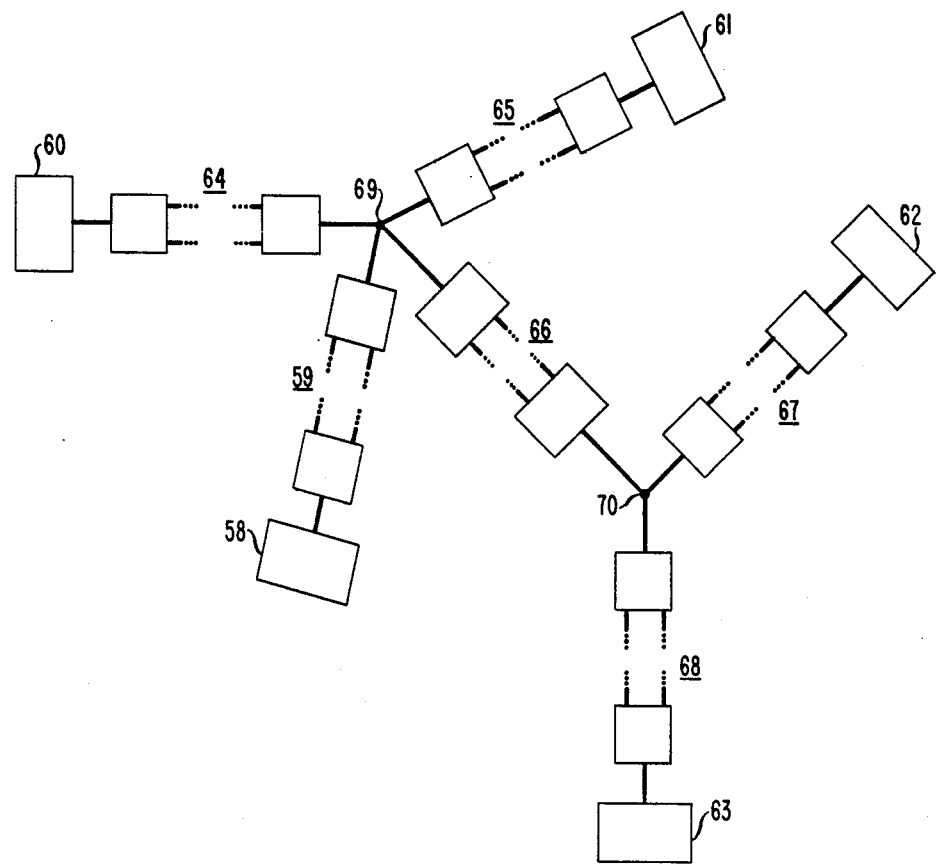
FIG. 6 shows another network configuration.

As indicated hereinabove, it is an advantage of the present invention that it permits new network configurations. If, for example, an all electrical network was connected in a star configuration, the impedance mismatch at the common junction could produce signal reflections that would improperly indicate a collision situation. However, because of the ability of the interface network to prevent the back transmission of the incident signal, false collision indications are avoided. Thus, for example, a star network configuration of the type shown in FIG. 6 is possible. In this illustrative network, a first plurality of stations 59, 60, and 61 are connected to a common junction 69 by means of a first plurality of optical buses 59, 64, and 65. Similarly, a second plurality of stations 62 and 63 are connected to a second common junction by means of a second plurality of optical buses 67 and 68. The common junctions 69 and 70 are, in turn, connected by means of an additional optical bus 66. Each bus comprises, as illustrated in FIG. 2, a pair of lightguides terminated at each end by an optical-to-electrical interface network of the type illustrated in FIGS. 3 and 4.

What is claimed is:

1. A network (23) for interfacing between an optical circuit (20) and an electrical circuit (5,7,9) comprising:
    receiving means (31) for converting optical signals into electrical signals disposed between a first lightguide (21) in said optical circuit (20) and said electrical circuit (5,7,9);
    transmitting means (35) for converting electrical signals into optical signals disposed between said electrical circuit (5,7,9) and a second lightguide (22);
    and means (32,33,34), including a coincidence sensor, for preventing the transmission of signals between said two lightguides (21,22).

2. The network according to claim 1 wherein said coincidence sensor comprises an exclusive OR-gate having:
    one input terminal coupled to the output port of said receiving means;
    a second input terminal coupled to said electrical circuit;
    and having its output terminal coupled to the input port of said transmitting means.

3. The network according to claim 1 wherein said coincidence sensor is a Schmidt trigger having:
    one input terminal coupled to the output port of said receiving means;
    a second input terminal coupled to said electrical circuit;
    and having its output terminal coupled to the input port of said transmitting means.

4. The network according to claim 1 including an AGC refreshing circuit for injecting pulses into said optical circuit in the absence of a signal.

5. A network (23) for interfacing between an electrical circuit (5,7,9) and an optical link (20) comprising:
    a signal receiver (31) having an optical input port (1) and an electrical output port (1');
    a signal transmitter (35) having an electrical input port (3') and an optical output port (3);
    first means, including a first electrical signal isolator (32), for coupling the output port (1') of said receiver (32) to a common electrical signal port (2);
    second means, including in cascade, a second electrical signal isolator (33) and a coincidence sensor (34), for connecting said common electrical signal port (2) to the input port (3') of said transmitter (35);
    the output port of said second isolator (33) being connected to one input port of said sensor (34);
    and the output port (1') of said receiver (31) being coupled to a second input port of said sensor (34).

6. An optical communication system comprising at least two stations;
    means, comprising an optical bus, for connecting each of said stations to a common electrical junction;
    each of said buses comprising a pair of optical fibers terminated by means of a network for interfacing between said fibers and said common junction;
    said network comprising:
        receiving means for converting optical signals into electrical signals disposed between one of said fibers and said common junction;
        transmitting means for converting electrical signals into optical signals disposed between said common junction and the other of said fibers;
        and means including a coincidence sensor for preventing the transmission of signals between said pair of optical fibers.

* * * * *